2,702,286

RUBBER TREATMENT

Alfred N. Iknayan, Grosse Pointe Farms, Mich., and Lester C. Peterson and Harvey J. Batts, Indianapolis, Ind., assignors to United States Rubber Company, New York, N. Y., a corporation of New Jersey No Drawing. Application July 14, 1953,
Serial No. 367,972

27 Claims. (Cl. 260—33.6)

This invention relates to novel treatment of Butyl rubber. The term "Butyl rubber" is used herein in its ordinary meaning to denote a sulfur vulcanizable rubbery copolymer of a major proportion of isobutylene and a minor proportion of a multi-olefinic unsaturate having from 4 to 14 carbon atoms per molecule, the multi-olefinic unsaturate usually being an aliphatic conjugated $C_4$ to $C_8$ diolefin, typically isoprene or butadiene, the proportions usually ranging from 90 to 99.5% of isobutylene and correspondingly from 10 to 0.5% of the multi-olefinic unsaturate.

Butyl rubber is an important article of commerce. However, it is subject to many disadvantages. An extremely serious disadvantage is that it is not possible to successfully mix with the raw Butyl rubber more than a few percent of the substantially non-volatile hydrocarbon oils such as those which are now attaining great commercial importance as extenders for butadiene-styrene rubbery copolymers (GR-S) and natural rubber. It is difficult to incorporate more than 25 parts of such oil per 100 parts of polymer without getting a mixture that is too soft to process. It would be totally out of the question to incorporate 50 parts of oil in ordinary Butyl rubber stocks because the resulting mixture would be "soupy" or "mushy" and difficult or impossible to process.

The present invention is based upon our discovery that if Butyl rubber is heated with a curing agent therefor in such amount and under such conditions as to render at least 10% but not over 80% of the original Butyl polymer benzol-insoluble, the resulting material will tolerate large amounts of substantially non-volatile hydrocarbon oil and still give firm easily processable mixtures. As will appear hereinafter, the oil can be present during the heating step or can be added subsequently. We usually incorporate at least 25 parts of such oil per 100 parts of Butyl rubber. (All figures given herein for amounts of materials blended with the Butyl rubber are based on 100 parts of original raw Butyl polymer.) More commonly we incorporate from 35 to 90 parts of such oil. Those mixtures which contain 40 or more parts of the oil are particularly advantageous. A marked advantage of those mixtures which contain 40 to 90 parts of oil is that they are solid materials which lend themselves to ready handling in the same manner as ordinary raw Butyl rubber, raw natural rubber or the like. Thus our invention makes feasible the high loading of Butyl rubber with oil, which has not heretofore been commercially possible.

In practicing our invention we particularly prefer to employ from 50 to 90 parts of the substantially non-volatile hydrocarbon oil. It will be seen that our invention greatly extends the available Butyl rubber supply and greatly lowers the cost of products made with Butyl rubber. At the same time our invention brings about important improvements in the physical properties of both the unvulcanized and the vulcanized stocks.

In a typical embodiment of our invention, we intimately admix the raw Butyl rubber with a curative therefor in an amount which is only a fraction of that required to completely cure the Butyl rubber. We then heat this mixture, either under static conditions or while masticating the mixture either in an internal mixer such as a Banbury or on an open rubber mill, to an elevated temperature at which reaction between the Butyl rubber and the curative will take place. Almost invariably we continue this heating until the potential curing action of the curative has been substantially completely exhausted. This heat treatment causes the curative to react with the Butyl rubber in such a manner as to render at least 10% but not over 80% thereof insoluble in benzol. The heat treatment also greatly enhances the physical properties of the Butyl rubber and converts it to a material which is in certain respects far easier to process, has increased nerve, has reduced plasticity which is reflected in higher numerical values for Mooney viscosity and Williams plasticity number, and has an increased elasticity which is reflected in a higher Williams recovery value. In many respects the treatment imparts to the Butyl rubber many of the properties of natural rubber.

Control over the extent of change in the Butyl rubber is exercised by adjusting the amount of the curative and the time and temperature of the heat treating step with the result that from 10 to 80% of the original Butyl rubber is converted to benzol-insoluble form.

The heat treatment can be effected at temperatures as low as 235° F., provided the heating time is proportionately adjusted to effect the desired change in the Butyl rubber. The treating temperature can range upwardly from 235° F. to the point at which the stock would be injured by thermal decomposition. We prefer to employ a temperature of at least 300° F., say from 300 to 450° F. Time and temperature are inversely correlated.

The heat treatment can be done under static conditions, for example, by applying extraneous heat to the mixture in an oven, or by holding slabs or "pigs" of the mixture at elevated temperature, for suitable times, typically 5-24 hours. Alternatively we can effect the heat treatment by masticating the mixture in an internal mixer, especially a Banbury mixer, or on an open rubber mill, and allowing the heat generated by the mixing procedure to raise the temperature of the mixture and thereby accelerate the reaction.

We can effect the heat treatment (and reaction between the Butyl rubber and the curative) by a combination of masticatory and static heat treatment, for example, by first masticating several minutes at elevated temperature to form an intimate mixture and perhaps initiate the reaction, discharging the hot mixture, rolling the hot stock into "pigs" and holding these pigs at an elevated temperature (235° F. or above) for a prolonged time. Example 23 portrays such a combined process wherein excess Banbury mixing time, which characterizes many other modes of oil-extending Butyl rubber in accordance with our invention, is obviated by using a phenolic resin curative in conjunction with a heavy metal halide as an accelerator of the reaction between such a curative and the Butyl rubber. The proportions of ingredients in the charge will typically be from 25 to 100 parts of oil, 40 to 100 parts of carbon black, 0.25 to 2.0 parts of phenolic resin curative, and 1 to 3 parts of heavy metal halide per 100 parts of Butyl rubber.

If an open rubber mill is used for performing the heat treatment, we often prefer to heat the rolls thereof so as to cause the temperature of the stock to more rapidly rise to levels within the higher portion of the indicated range. With an internal mixer no extraneous heating or cooling is usually required.

When the heat treatment is carried out by a mastication process in an internal mixer, as in a Banbury mixer, we prefer to allow the temperature to rise to 300° F. or higher and to carry out the mastication at the resulting temperature since a temperature of at least 300° F. greatly speeds up the reaction and correspondingly increases the productivity of the equipment.

In practicing our invention, we typically add the curative to the raw Butyl rubber in a Banbury mixer and masticate therein at 300–450° F. for a suitable period of time, say for 5–15 minutes. If an open rubber mill is employed, the time of milling may be longer, ranging up to 35 minutes, depending upon temperature and other factors.

We can apply our treatment to Butyl rubber by itself or to mixtures thereof with compounding materials such as carbon black, clay, neutral softeners, such as substantially non-volatile hydrocarbon oils, etc. If desired, we can have present during the heat treatment both carbon black and such a softener.

As the curative, we can use any material capable of vulcanizing or curing Butyl rubber at an elevated temperature of 235° F. or higher. Examples are sulfur, ultra accelerators of sulfur vulcanization, such as a thiuram accelerator, e. g., a tetralkylthiuram monosulfide or disulfide, especially tetramethyl thiuram disulfide, or a dithiocarbamate accelerator, e. g., a zinc, tellurium or selenium dialkyl dithiocarbamate, dibenzyl dithiocarbamate or N-pentamethylene dithiocarbamate, or combinations of sulfur and ultra accelerators, e. g., mixtures of sulfur and tetraalkylthiuram monosulfides or disulfides, para-dinitrosobenzene, meta-dinitrosobenzene, mixtures of para-quinone-dioxime and an oxidizing agent such as red lead, and 4-hydrocarbon-2,6-dimethylolphenols and resinous self-condensation products thereof. These self-condensation products are oil-soluble heat-reactive materials soluble in Butyl rubber. For a more complete description of the 4-hydrocarbon-2,6-dimethylolphenols and self-condensation products thereof, reference is made to our copending application Serial No. 290,344, filed May 27, 1952. The self-condensation products of such phenols are commonly referred to by skilled workers in the art as being oil-soluble and as being heat-reactive; see for example Honel U. S. Patent 2,058,797, Honel et al. British 417,122, Brubaker U. S. Patent 2,046,318, Turkington et al. Ind. Eng. Chem., 33, 966 (1941) and Shreve et al., ibid, 43, 134 (1951).

Prior to, during or after the heat treating step we incorporate at least 25 parts of a substantially non-volatile hydrocarbon oil. In some cases a portion or all of this oil may be present during the heat treatment and the remainder, if any, may be added after the heat treatment.

The amount of curative which is reacted with the Butyl rubber in the heat treatment will vary widely depending upon many factors, particularly the curative employed. In the case of 4-hydrocarbon-2,6-dimethylolphenols and heat-reactive oil-soluble self-condensation products thereof, we employ from 0.25 to 2 parts thereof per 100 parts of original Butyl polymer. In the case of para-dinitrosobenzene or meta-dinitrosobenzene we generally, use from 0.1 to 0.4 part thereof per 100 of Butyl rubber; the most common commercial form of para-dinitrosobenzene is the material known in the trade as "Polyac" which is a mixture of 25% para-dinitrosobenzene and 75% of inert carrier, and when this material is used due allowance for the diluent effect of the filler must be made. In the case of mixtures of para-quinone-dioxime and an oxidizing agent, e. g., red lead, we typically employ from 0.02 to 0.075 part of para-quinone-dioxime and from 0.1 to 0.3 part of the oxidizing agent. In the case of an ultra accelerator, e. g. tetramethyl thiuram disulfide, used by itself as a curative, we typically employ from 0.1 to 1.0 part thereof. In the case of sulfur alone, we typically employ from 0.5 to 3 parts thereof. We have obtained good results using a mixture of sulfur and an ultra accelerator such as tetramethyl thiuram disulfide as the curative, typically using from 0.05 to 0.2 part of sulfur and from 0.02 to 0.2 part of ultra accelerator in such mixtures.

When the curative is sulfur or a mixture of sulfur and ultra accelerator, it is highly preferred to have a small amount of zinc oxide, typically 1 to 5 parts thereof per 100 parts of Butyl rubber, present during the heat treatment. Inclusion of zinc oxide in these amounts promotes or activates the pre-scorching action of such curatives upon the Butyl rubber.

In the case of the phenolic curatives the desired reaction may be retarded by the presence in the Butyl rubber of certain materials normally incorporated therein by the manufacturer and exemplified by certain amines, especially phenyl beta-naphthylamine, used as stabilizing antioxidants, metallic soaps, such as zinc stearate, and free fatty acids, such as stearic acid. The retarding action of the specified materials is most announced when the amount of the phenolic curative is in the lower portion of the above-mentioned range, e. g., from 0.25 to 1 part per 100 parts of Butyl rubber. The retarding effect of such materials can be compensated by an appropriate increase in the amount of phenolic curative used or can be reduced by using a heavy metal halide as an accelerator of the reaction between the Butyl rubber and the phenolic curative.

The extent of conversion of the Butyl rubber to benzol-insoluble form is, as a practical matter, determined by the amount of the curative employed. As previously indicated, we employ such an amount of curative as to convert at least 10% but not more than 80% of the original Butyl rubber to benzol-insoluble form. Conversions of substantially less than 10% do not sufficiently improve the properties of the Butyl rubber for the purposes of our invention while conversions of substantially more than 80% are not practical because they make processing excessively difficult if not impossible.

The benzol-insoluble portion of the treated Butyl rubber is determined by simply extracting a sample with pure benzol at room temperature for 24 hours, drying the sample, and determining the amount of insoluble material. The benzol-insoluble hydrocarbon portion of the treated Butyl rubber is determined by correcting the value thus obtained to account for the amount of carbon black or other benzol-insoluble material present with the Butyl rubber during the heat treatment. Details of a convenient method of measuring the benzol-insoluble content of the treated Butyl rubber are as follows:

The sample is cut into thin strips about 5 mm. long and less than 1 mm. in thickness. About .30 of a gram of the sample is weighed carefully and placed in a Baker cell equiped with 200 mesh stainless steel screen and approximately 75 cc. of pure benzol. The cell is stoppered and placed in the dark for 24 hours at 75° F. At the end of 24 hours, the excess solvent and dissolved Butyl rubber is drawn off. The residue is dried and weighed to determine the benzol-insoluble content. When benzol-insoluble materials such as fillers are present, allowance is made when computing the benzol-insoluble Butyl.

$$\text{Benzol-insoluble Butyl} = \frac{\text{Weight dry residue}}{\text{Weight sample}} \times 100$$

When insoluble filler is present:

$$\text{Benzol-insoluble Butyl} = \frac{(\text{Dry residue percent} - \text{percent insoluble filler})}{\text{Percent Butyl in compound}} \times 100$$

The Baker cell is well-known in the rubber industry, being used in the standard method for determining benzol-insoluble material in rubber samples. A certain amount of benzol-insoluble material is found by the foregoing method when carbon black is milled with Butyl rubber at high temperature in the absence of a curative. However, the amount of benzol-insoluble material so formed is insufficient for the purposes of our invention, and such high temperature milling in the absence of the curative is incapable of giving the high oil tolerance achieved by our invention.

An inner tube made with a stock comprising Butyl rubber which has been partially cured and blended with from 50 to 90 parts, for example from 60 to 75 parts, of substantially non-volatile hydrocarbon oil per 100 of Butyl rubber is resistant to cold and, even at temperatures as low as −30° F. and even when run under-inflated, does not exhibit the undesirable and commonly known property of "cold buckling" which has presented such a problem in the Butyl rubber inner tube field.

Any substantially non-volatile hydrocarbon oil commonly used in rubber compounding and compatible with Butyl rubber can be used in practicing our invention. Examples of suitable oils are shown in Lightbown et al. U. S. Patent 2,392,855.

As indicated above, part or all of the oil can be present during the heat treatment. Likewise, part or all of the filler to be used, such as carbon black, can be present during the heat treatment.

In another aspect of our invention, we effect a substantial and commercially important reduction in torsional hysteresis and at the same time a substantial and commercially important increase in electrical resistivity of the vulcanizate by carrying out the reaction of the Butyl rubber with the curative in the presence of at least 20 parts of carbon black and better yet at least 40 parts of carbon black at a temperature of at least 275° F. under such conditions that at least 20% of the Butyl rubber is rendered benzol-insoluble by reaction of the Butyl rubber with the curative and the carbon black. In this aspect of our invention we prefer to use the more highly reactive reinforcing types of carbon black, namely the channel blacks and the more reactive grades of furnace black; we also prefer to perform the heat treatment of the mixture of Butyl rubber, curative and carbon black by mastication, especially in a Banbury mixer, at a temperature of 300° F. or over, e. g., at 325–450° F. The vulcanizates resulting from this aspect of our invention have considerably lower torsional hysteresis and considerably higher electrical resistivity than would be the case if the heat treatment were carried out in the absence of the black and the same amount of black subsequently incorporated in the normal way. Those skilled in the art commonly consider that a marked reduction in torsional hysteresis and a marked increase in electrical resistivity are accompanied by a corresponding increase in wear-resistance. Hence this aspect of our invention is of great importance.

The loading with fillers such as carbon black can vary widely. When oil loading and carbon black loading are used, the carbon black loading can vary with the degree of the oil loading. For example, at oil loadings of 50 parts in inner tube stocks, we often use carbon black loadings of from 75 to 90 parts.

Generally speaking, the amount of carbon black used in the stocks can vary widely, for example, from 10 to 200 parts, depending upon many factors including end use, type of carbon black, etc.

Instead of carbon black, we can use any other suitable filler, examples being clay, calcium carbonate, precipitated hydrated silica, precipitated hydrated calcium silicate, etc.

The mixture of partially cured or "pre-scorched Butyl" with or without some or all of the oil and with or without some or all of the carbon black, can be shipped and handled as an article of commerce for use as a replacement for the raw Butyl of commerce. Upon incorporation of conventional compounding ingredients such as a vulcanizing agent, typically sulfur, in amount sufficient to completely cure the Butyl rubber, together with any other desired compounding ingredients such as carbon black or other filler or pigment, vulcanization accelerators, zinc oxide, etc., the resulting mixture can be shaped and vulcanized in the conventional manner.

Stocks made in accordance with our invention show extremely high resistance to "fold breakdown," by which is meant that the unvulcanized stocks, especially inner tube stocks, do not exhibit failure from creasing; this is in marked contrast to ordinary stocks. Thus, a raw inner tube made of ordinary Butyl rubber stock and left in flat condition around the plant for some time before curing often develops cracks and areas of weakness along the creases. In addition, the stocks of our invention are not readily damaged by the creasing and pressing which take place in the inner tube splicing operation whereas ordinary sulfur-compounded Butyl rubber stocks, and particularly those containing sufficient hydrocarbon oil to give protection against cold buckling, are subject to frequent damage during splicing, particularly in hot weather.

In addition, the stocks made in accordance with the present invention exhibit a substantially lower torsional hysteresis than conventional Butyl rubber stocks. This lower hysteresis is not solely due to the use of a higher proportion of oil but is partially due to the preliminary reaction of the Butyl rubber with the curative. Generally speaking, an even greater lowering in torsional hysteresis is brought about when part of the carbon black is present during the reaction of the Butyl rubber with the curative. In general, the greater the proportion of carbon black present during the initial Butyl rubber-curative reaction the greater the effect in lowering of hysteresis. For optimum reduction in torsional hysteresis, at least 40 parts of carbon black should be present during this reaction.

The present invention, by enabling the incorporation of extremely large quantities of oil without converting the Butyl rubber into an unusable, difficult-to-handle material, correspondingly extends the available Butyl rubber supply. The properties of the oil-extended partially cured Butyl rubber of the present invention are not adversely affected but actually are considerably improved as compared to regular Butyl rubber. In addition, the present invention enables the incorporation of an increased amount of filler, such as carbon black, without impairing the physical properties of the Butyl rubber, this also correspondingly extending the supply of Butyl rubber.

Care should be taken that the effects of the preliminary reaction of the curative with the Butyl rubber are not worked out to any substantial extent by milling or mastication intermediate the preliminary reaction and final vulcanization. The reason for this is that if the effects were worked out, for example, by excessive mastication during incorporation of additional compounding ingredients intermediate the heat treatment and final vulcanization, many of the advantages of the invention would be lost.

The following examples illustrate our invention in more detail. All parts expressed herein are by weight.

*Examples 1 to 7*

In these examples lots of Butyl rubber were treated in a factory Banbury mixer. The Mooney gum plasticities (large rotor at 212° F.) of the original Butyl rubber averaged 78 for a three minute plasticity time and 73 for an 8¼ minute plasticity time.

Complete data on the formulations of these examples is given in the table below. In each case the formulations indicated under "Base Stock" were first prepared and masticated in a Banbury mixer for the time and at a temperature ranging up to the maximum indicated in the table. The plasticities of the resulting stocks were then measured. The percentage of the original Butyl rubber hydrocarbon which had been converted to benzol-insoluble form in the high temperature Banbury treatment was then determined for each stock. The resulting base stocks were then compounded in the Banbury mixer with the ingredients listed after the heading "Second Stage Mixing." The reaction between the Butyl rubber and the curing agent took place in the first stage of Banbury mixing.

The stocks resulting from the "Second Stage Mixing" were then sulfured as indicated in the table under "Recipe" with 2 parts of sulfur, and 1 part of mercaptobenzothiazole and 1.5 part tetramethyl thiuram disulfide. One part of stearic acid was incorporated at this point in the stocks of Examples 2 to 4. The resulting stocks were then cured and the properties of the vulcanizates were determined.

Example 1 was the control and used no curative in the initial Banbury heat treatment. The plasticity of the resulting base stock was notably low in comparison to the plasticities of the other base stocks. After the second stage mixing, in which 50 parts of oil were included, the mixture of Example 1 had an extremely low plasticity and was so soft that it would be impossible to handle it under normal factory conditions. In Example 2 one part of a phenolic resin curative was used in the initial Banbury heat treatment. In Example 3 the carbon black was dispensed with in the Banbury heat treatment; in this example the amount of the phenolic resin was reduced to 0.75 part because an attempt to use 1 part of the resin in Example 3 gave too high a degree of reaction to allow finishing of the material as workable stock. It will be seen that Examples 2 and 3 give a fairly direct comparison of the presence and absence of a portion (20 parts out of a total of 80 parts) carbon black during the Banbury heat treatment. In Example 4 the curative was 0.75 part of the commercial form of para-dinitrosobenzene which was 25% active. In Example 5 the curative consisted of 0.05 part of para-quinone-dioxime and 0.20 part of red lead. In Example 6 the curative was 0.25 part of tetramethyl thiuram disulfide. In Example 7 the curative consisted of 0.05 part of tetramethyl thiuram disulfide and 0.10 part of sulfur. In all of the examples a total of 80 parts of carbon black were used and in Examples 1, 2 and 4 to 7 twenty parts of the total carbon black were present during the Banbury heat treatment. In all of the examples 50 parts of a substantially non-volatile hydrocarbon oil were added during the second stage mixing. The data were as follows:

| Example No. | 1 | 2 | 3 | 4 | 5 | 6 | 7 |
|---|---|---|---|---|---|---|---|
| Base Stock: | | | | | | | |
| GR-I 18 | 100.00 | 100.00 | 100.00 | 100.00 | 100.00 | 100.00 | 100.00 |
| FEF Black (Note 1) | 20.00 | 20.00 | | 20.00 | 20.00 | 20.00 | 20.00 |
| Zinc Oxide | | | | | | 3.00 | 3.00 |
| "Amberol Resin ST-137" (Note 2) | | 1.00 | .75 | | | | |
| "Polyac" (Note 3) | | | | .75 | | | |
| para Quinone dioxime | | | | | .05 | | |
| Red Lead | | | | | .20 | | |
| "Tuex" (tetra-methyl thiuram disulfide) | | | | | | .25 | .05 |
| Sulfur | | | | | | | .10 |
| Batch Time (minutes) | 9.75 | 10.75 | 13.00 | 11.00 | 10.00 | 9.75 | 10.50 |
| Maximum Temp. (° F.) | 370 | 390 | 350 | 370 | 350 | 350 | 350 |
| Mill Condition | Rolled off | Rolled off | *Massed | Rolled off | *Massed | Rolled off | Rolled off |
| Base Stock Plasticities: | | | | | | | |
| Linhorst (Note 4)— | | | | | | | |
| 3' at 212° | .0230 | .0436 | .0365 | .0465 | .0660 | .0380 | .0545 |
| 60' at 350° | .0214 | .0604 | .0410 | .0425 | .0485 | .0500 | .0290 |
| Mooney LR-212° | 88 | 119 | 88 | 118 | | 110 | 127 |
| Williams— | | | | | | | |
| 3' at 212° PN | 305 | 464 | 460 | 536 | 520 | 400 | 476 |
| RV | 7 | 200 | 427 | 371 | 300 | 63 | 269 |
| 60' at 350° PN | 305 | 539 | | | | | 347 |
| RV | 4 | 376 | | | | | 32 |
| Percent Benzol Insoluble | 4.0 | 31.0 | 13.0 | 40.0 | 26.2 | 20.6 | 27.0 |
| Second Stage Mixing: | | | | | | | |
| Base Stock (above) | 120.00 | 121.00 | 100.75 | 120.75 | 120.25 | 123.25 | 123.15 |
| FEF Black | 10.00 | 10.00 | 30.00 | 10.00 | 10.00 | 10.00 | 10.00 |
| SRF Black (Note 5) | 50.00 | 50.00 | 50.00 | 50.00 | 50.00 | 50.00 | 50.00 |
| Mineral Oil (Note 6) | 50.00 | 50.00 | 50.00 | 50.00 | 50.00 | 50.00 | 50.00 |
| Zinc Oxide | 3.00 | 3.00 | 3.00 | 3.00 | 3.00 | | |
| Stearic Acid | 1.00 | | | | 1.00 | 1.00 | 1.00 |
| Batch Time (minutes) | 16.0 | 10.00 | 9 | 10.75 | 10.5 | 9.75 | 9.75 |
| Maximum Temp. (° F.) | 230 | 275 | 300 | 280 | 270 | 270 | 290 |
| Second Stage Plasticities: | | | | | | | |
| Linhorst— | | | | | | | |
| 3' at 212° | .0075 | .011 | .011 | .010 | .0305 | .0155 | .0190 |
| 60' at 350° | .0065 | .016 | .0145 | .0105 | .0145 | .0140 | .0100 |
| Mooney LR-212° | 27 | 35 | 33 | 32 | 41 | 36 | 34 |
| Williams— | | | | | | | |
| 3' at 212° PN | 180 | 269 | 233 | 262 | 388 | 320 | 335 |
| RV | 0 | 19 | 14 | 8 | 183 | 32 | 64 |
| 60' at 350° PN | 205 | | 242 | | 271 | 265 | 245 |
| RV | 0 | | 14 | | 17 | 9 | 3 |
| Recipe: | | | | | | | |
| Base Stock | 234.00 | 234.00 | 233.75 | 233.75 | 234.25 | 234.25 | 234.15 |
| MBT (Mercaptobenzothiazole) | 1.00 | 1.00 | 1.00 | 1.00 | 1.00 | 1.00 | 1.00 |
| "Tuex" | 1.50 | 1.50 | 1.50 | 1.50 | 1.50 | 1.50 | 1.50 |
| Sulfur | 2.00 | 2.00 | 2.00 | 2.00 | 2.00 | 2.00 | 2.00 |
| Stearic Acid | | 1.00 | 1.00 | 1.00 | | | |
| Cure—3¼' at 350° F.: | | | | | | | |
| Tensile | 1,265 | 1,320 | 1,335 | 1,040 | 1,320 | 1,430 | 1,300 |
| Elongation | 830 | 680 | 810 | 640 | 770 | 850 | 830 |
| 300% Modulus | 205 | 415 | 310 | 420 | 310 | 290 | 305 |
| 500% Modulus | 490 | 840 | 600 | 790 | 690 | 565 | 610 |
| Hardness | 44 | 38 | 37 | 35 | 38 | 41 | 39 |
| Perm. Set | 22 | 23 | 20 | 23 | 19 | 19 | 19 |
| 5' at 350° F.: | | | | | | | |
| Tensile | 1,290 | 1,355 | 1,385 | 1,300 | 1,270 | 1,310 | 1,270 |
| Elongation | 780 | 680 | 780 | 630 | 700 | 770 | 780 |
| 300% Modulus | 280 | 440 | 360 | 585 | 445 | 370 | 400 |
| 500% Modulus | 560 | 855 | 665 | 1,000 | 840 | 680 | 715 |
| Hardness | 47 | 40 | 40 | 38 | 40 | 44 | 42 |
| Set | 28 | 28 | 23 | 27 | 24 | 20 | 24 |
| Acetone Extract | 23.41 | 23.09 | 23.14 | 22.32 | 22.88 | 22.04 | 22.54 |
| Tor. Hysteresis (100° F.) | .263 | .217 | .190 | .194 | .182 | .204 | .220 |
| Tor. Hysteresis (285° F.) | | .173 | .172 | .151 | | | |
| 10' at 350° F.: | | | | | | | |
| Tensile | 1,130 | 1,235 | 1,230 | 1,200 | 1,255 | 1,220 | 1,175 |
| Elongation | 640 | 570 | 650 | 530 | 610 | 650 | 670 |
| 300% Modulus | 440 | 590 | 495 | 705 | 550 | 510 | 500 |
| 500% Modulus | 785 | 1,050 | 850 | 1,130 | 995 | 890 | 860 |
| Hardness | 49 | 43 | 43 | 42 | 45 | 48 | 46 |
| Set | 34 | 34 | 29 | 33 | 30 | 28 | 30 |

*Stock tied together but did not band on mill.
NOTE 1.—Fast-extruding furnace carbon black.
NOTE 2.—A heat-reactive, oil-soluble alkaline-catalyzed p-octyl-phenol-formaldehyde resin of the resol type.
NOTE 3.—25% p-dinitrosobenzene; 75% inert carrier.
NOTE 4.—A full description of the apparatus and method used for the measurement of Linhorst Plasticity is given in the copending application of E. F. Linhorst, Serial No. 277,779, filed March 21, 1952.
NOTE 5.—Semi-reinforcing furnace carbon black.
NOTE 6.—Mineral Oil having a viscosity of 160-180 Saybolt at 100° F.

The considerable reduction in torsional hysteresis of the vulcanizates as the result of preliminarily reacting the Butyl rubber with the curative is plainly apparent by comparison of the torsional hysteresis values given for the five minute cures for Examples 2 to 7 with Example 1. It will be seen that the preliminary Banbury heat treatment in the absence of a curative in Example 1 imparted to the Butyl rubber only 4% of benzol-insoluble material while the preliminary heat treatment in the presence of curatives in Examples 2 to 7 converted more than 10% of the original Butyl polymer to benzol-insoluble form.

Examples 8 to 15

In these examples, the effect of having 65 parts of carbon black present during the reaction between the Butyl rubber and the curative is demonstrated. The marked reduction in torsional hysteresis and increase in electrical resistivity of the vulcanizates are to be noted.

| Example | 8 | 9 | 10 | 11 | 12 | 13 | 14 | 15 |
|---|---|---|---|---|---|---|---|---|
| GR-I 18 | 100 | 100 | 100 | 100 | 100 | 100 | 100 | 100 |
| FEF Black | 30 | 30 | 30 | 30 | 30 | 30 | 30 | 30 |
| SRF Black | 35 | 35 | 35 | 35 | 35 | 35 | 35 | 35 |
| Mineral Oil (same as in Examples 1 to 7) | 5 | 5 | 5 | 5 | 5 | 5 | 5 | 5 |
| "Amberol ST-137" Resin (see Note 2, Ex. 1) | | 1.0 | .75 | | | | | |
| "Polyac" (see Note 3, Ex. 1) | | | | .75 | | | | |
| para-Quinone-dioxime | | | | | .05 | | | |
| Red Lead | | | | | .20 | | | |
| "Tuex" | | | | | | .25 | .05 | |
| Sulfur | | | | | | | .10 | 2.0 |
| Zinc Oxide | | | | | | 3.0 | 3.0 | 3.0 |

The above were hot milled 30' at 325° F. After hot milling, samples were taken for plasticities and Benzol-insoluble Butyl. The following data were obtained:

| | | | | | | | | |
|---|---|---|---|---|---|---|---|---|
| Linhorst Plasticity (3' at 212° F.) | .022 | .027 | .026 | .052 | .050 | .035 | .046 | .068 |
| Mooney Plasticity (LR-212° F.) | 76 | 86 | 86 | 122 | 113 | 93 | 102 | 152 |
| Williams PN (3' at 212° F.) | 289 | 312 | 311 | 494 | 476 | 386 | 438 | 563 |
| RV | 4 | 7 | 10 | 113 | 133 | 38 | 97 | 271 |
| Percent of Butyl Rendered Benzol-insoluble | 7.5 | 13.7 | 12.1 | 38.6 | 33.6 | 19.4 | 28.3 | 51.0 |

The above stocks were then compounded with the following ingredients on a cool mill:

| | | | | | | | | |
|---|---|---|---|---|---|---|---|---|
| Mineral Oil (same as in Examples 1 to 7) | 45 | 45 | 45 | 45 | 45 | 45 | 45 | 45 |
| Zinc Oxide | 3 | 3 | 3 | 3 | 3 | | | |
| Stearic Acid | 1 | 1 | 1 | 1 | 1 | 1 | 1 | 1 |
| MBT | 1 | 1 | 1 | 1 | 1 | 1 | 1 | 1 |
| "Tuex" | 1.5 | 1.5 | 1.5 | 1.5 | 1.5 | 1.5 | 1.5 | 1.5 |
| Sulfur | 2.0 | 2.0 | 2.0 | 2.0 | 2.0 | 2.0 | 2.0 | |

The stock of Example 8 was decidedly "mushy" and unprocessable and therefore wholly unsatisfactory for fabrication into useful articles. Examples 9 to 15 were free from this objection. Upon curing the resulting stocks at 350° F. the following data upon the vulcanizates were obtained:

| Cure Time: | | | | | | | | |
|---|---|---|---|---|---|---|---|---|
| Tensile— | | | | | | | | |
| 3½' | 1,435 | 1,390 | 1,110 | 1,360 | 1,480 | 1,430 | 1,460 | 1,310 |
| 5' | 1,480 | 1,470 | 1,460 | 1,500 | 1,605 | 1,590 | 1,550 | 1,500 |
| 10' | 1,470 | 1,580 | 1,370 | 1,540 | 1,450 | 1,570 | 1,600 | 1,620 |
| Elongation— | | | | | | | | |
| 3½' | 860 | 880 | 820 | 650 | 760 | 840 | 840 | 810 |
| 5' | 800 | 810 | 810 | 640 | 730 | 800 | 780 | 790 |
| 10' | 730 | 760 | 740 | 590 | 620 | 650 | 730 | 730 |
| 300% Modulus— | | | | | | | | |
| 3½' | 165 | 160 | 165 | 335 | 265 | 190 | 220 | 240 |
| 5' | 230 | 240 | 265 | 500 | 375 | 275 | 320 | 295 |
| 10' | 315 | 320 | 340 | 590 | 540 | 510 | 430 | 400 |
| 500% Modulus— | | | | | | | | |
| 3½' | 400 | 440 | 110 | 915 | 730 | 475 | 530 | 545 |
| 5' | 535 | 630 | 600 | 1090 | 905 | 605 | 680 | 645 |
| 10' | 670 | 750 | 760 | 1,230 | 1,100 | 1,070 | 830 | 825 |
| Hardness— | | | | | | | | |
| 3½' | 27 | 25 | 24 | 25 | 25 | 26 | 25 | 25 |
| 5' | 30 | 29 | 27 | 29 | 30 | 30 | 29 | 29 |
| 10' | 33 | 31 | 31 | 31 | 31 | 33 | 32 | 31 |
| Set— | | | | | | | | |
| 3½' | 11 | 12 | 12 | 12 | 11 | 12 | 13 | 13 |
| 3' | 13 | 14 | 15 | 16 | 15 | 15 | 16 | 16 |
| 10' | 18 | 17 | 18 | 19 | 19 | 20 | 19 | 19 |
| Torsional Hysteresis at 100° F.— | | | | | | | | |
| 5' | .150 | .121 | .114 | .068 | .097 | .131 | .113 | .117 |
| 10' | .135 | .101 | .109 | .072 | .070 | .111 | .100 | .096 |
| at 285° F.— | | | | | | | | |
| 5' | .112 | .106 | .100 | .081 | .085 | .111 | .096 | .104 |
| 10' | .108 | .094 | .089 | .064 | .064 | .101 | .088 | .084 |
| Electrical Resistivity— | | | | | | | | |
| 3½' | $2 \times 10^7$ | $2 \times 10^{10}$ | $2 \times 10^{10}$ | $>1 \times 10^{11}$ | $>1 \times 10^{11}$ | $1 \times 10^{10}$ | $1 \times 10^{10}$ | $>1 \times 10^{11}$ |
| 5' | $2 \times 10^7$ | $1 \times 10^{11}$ | $1 \times 10^{10}$ | $>1 \times 10^{11}$ | $>1 \times 10^{11}$ | $5 \times 10^9$ | $9.5 \times 10^8$ | $1 \times 10^{10}$ |
| 10' | $6 \times 10^6$ | $3.5 \times 10^9$ | $2 \times 10^9$ | $>1 \times 10^{11}$ | $>1 \times 10^{11}$ | $2 \times 10^7$ | $5 \times 10^7$ | $1.5 \times 10^8$ |

Example 16

Inner tubes were made by the present invention from the following formulation.

| | Parts |
|---|---|
| Butyl (GR-I-18) | 100.00 |
| Amberol ST-137 resin * | .75 |
| Mercaptobenzothiazole | 1.00 |
| Tetramethyl thiuramdisulfide | 1.50 |
| Stearic acid | 1.00 |
| Zinc oxide | 3.00 |
| SRF carbon black | 50.00 |
| EPC carbon black | 30.00 |
| Mineral oil (viscosity 160–180 Saybolt at 100° F.) | 50.00 |
| Sulfur | 2.00 |
| | 239.25 |

* A heat-reactive, oil-soluble alkaline-catalyzed p-octyl-phenol-formaldehyde resin.

The Butyl, EPC black and resin were charged to a Banbury and mixed therein, the temperature gradually rising to 330° F. at 7.5 minutes. Then 10 parts of the oil were added and mixing was continued. At an elapsed time of 14 minutes the temperature had reached 365° F. and pre-scorching, which had actually started before 300° F. had been reached, was then substantially complete. The Banbury was then discharged and the stock permitted to cool. The benzol-insoluble portion of the mixture at this point was 41.8. The batch weight of 140.75 parts contained 30 parts of carbon black. Dividing 30 by 140.75 gives 21.4% of carbon black. Subtracting this from 41.8 gives 20.4% of insoluble hydrocarbon on the total mix. The percentage of Butyl rubber in the original batch was 71.2%. Dividing 20.4 by 71.2 gives 28.7% of the Butyl hydrocarbon which had been converted to benzol-insoluble form.

A proper amount by volume, selected with reference to the capacity of the Banbury, was then re-charged to the Banbury together with the SRF black, zinc oxide, stearic acid and the balance of the oil, which were employed in such proportions as to comply with the above formulation, and mixing was resumed. After 15 minutes the temperature had reached 265° F. at which point mixing was complete. The Banbury was then discharged. The stock was then mixed with the sulfur and accelerators, using proportions as indicated above, on an open rubber mill. The mixture was then converted into inner tubes by the conventional method including extruding, splicing and vulcanizing. The resulting inner tubes had the following physical properties.

| | |
|---|---|
| Curing time, minutes at 360° F. | 5' |
| Tensile, p. s. i. | 1,480 |
| Elongation, percent | 740 |
| Modulus 300% | 375 |
| Modulus 500% | 805 |
| Set (ASTM) | 18 |
| Hardness (Shore A) | 42 |
| Torsional hysteresis at 100° F. | 0.184 |

The low torsional hysteresis is noteworthy and is to be compared with a torsional hysteresis value (at 100° F.) of 0.245 for a conventional Butyl inner tube. The low torsional hysteresis brought about by the practice of our invention is due to the pre-scorching reaction with the resin and not to the high oil content.

Example 17

This example demonstrates the marked effect of pre-reacting Butyl rubber with a curative in the presence of carbon black by masticating the Butyl rubber-carbon black-curative mixture at high temperature, in bringing about a reduction in torsional hysteresis and an increase in electrical resistivity of vulcanizates of the resulting stock.

There were first prepared the following recipes:

| Ingredient | Example 17-A | Example 17-B |
|---|---|---|
| Butyl rubber (GR-I 18) | 100.00 | 100.00 |
| "Amberol ST-137" Resin | | 2.00 |
| Fast Extruding Furnace Black | 30.00 | 30.00 |
| Semi-Reinforcing Furnace Black | 50.00 | 50.00 |

The foregoing ingredients were mixed and hot milled on an open rubber mill for thirty minutes at 320° F., plus or minus 5° to effect, in the case of Example 9–B, reaction between the phenolic resin curative and the Butyl rubber. Upon cooling, these batches were re-milled with the following ingredients:

| Ingredient | Example 17-A | Example 17-B |
|---|---|---|
| Mineral Oil (Viscosity of 160–180 Saybolt at 100° F.) | 50.00 | 50.00 |
| Stearic Acid | 1.00 | 1.00 |
| Tetramethyl Thiuram Disulfide | 1.50 | 1.50 |
| Mercaptobenzothiazole | 1.00 | 1.00 |
| Sulfur | 1.50 | 1.50 |

The resulting stocks were then cured at 350° F. in the conventional manner. The vulcanizates had the following physical properties:

| | Cure at 350° F. | Example 17-A | Example 17-B |
|---|---|---|---|
| Tensile | 3½' | 1,310 | 1,390 |
| | 5' | 1,330 | 1,440 |
| | 10' | 1,200 | 1,330 |
| Elongation | 3½' | 850 | 770 |
| | 5' | 770 | 720 |
| | 10' | 710 | 650 |
| 300% Modulus | 3½' | 230 | 290 |
| | 5' | 260 | 270 |
| | 10' | 360 | 470 |
| 500% Modulus | 3½' | 510 | 830 |
| | 5' | 600 | 930 |
| | 10' | 760 | 1,020 |
| Hardness | 3½' | 33 | 30 |
| | 5' | 36 | 32 |
| | 10' | 40 | 36 |
| Hysteresis at 100° F. | 5' | .171 | .063 |
| | 10' | .156 | .078 |
| Hysteresis at 250° F. | 5' | .128 | .074 |
| | 10' | .123 | .065 |
| Electrical Resistivity | 3½' | $5 \times 10^6$ | $4 \times 10^{10}$ |
| | 5' | $4 \times 10^6$ | $4 \times 10^{10}$ |
| | 10' | $<10^7$ | $4 \times 10^{10}$ |

The initial hot-milling of the stock of Example 17–A converted considerably less than 10% of the original Butyl rubber hydrocarbon to benzol-insoluble form while in Example 17–B it converted considerably more than 10% of the original Butyl rubber hydrocarbon to benzol-insoluble form.

Examples 18 to 22–A

The following stocks were prepared on a cold mill.

| Stocks | 18 | 19 | 19-A | 20 | 21 | 22 | 22-A |
|---|---|---|---|---|---|---|---|
| GR-I 18 | 100.00 | 100.00 | 100.00 | 100.00 | 100.00 | 100.00 | 100.00 |
| FEF Black | 30.00 | 30.00 | 30.00 | 30.00 | 30.00 | 30.00 | 30.00 |
| SRF Black | 35.00 | 35.00 | 35.00 | 35.00 | 35.00 | 35.00 | 35.00 |
| Mineral Oil (same as in Examples 1–7) | 5.00 | 5.00 | 5.00 | 5.00 | 5.00 | 5.00 | 5.00 |
| "Ethasate" (zinc diethyl dithio-carbamate) | | 0.50 | 0.50 | | | | |
| "Selazate" (selenium diethyl dithio-carbamate) | | | | 0.50 | | | |
| "Ethyl Tellurac" (tellurium diethyl-dithio carbamate) | | | | | 0.50 | | |
| Sulfur | | | | | | 1.25 | 1.25 |
| Zinc oxide | 3.00 | 3.00 | 3.00 | 3.00 | 3.00 | 3.00 | 3.00 |

Stocks 18, 19, 20, 21 and 22 were hot milled 30' at 325° F.
Stocks 19-A and 22-A were oven-reacted 8 hours at 300° F.
The Mooney, Linhorst, Williams PN and RV plasticities and the benzol-insoluble Butyl rubber content (gel) of the resulting stocks were as follows:

| Stocks | 18 | 19 | 19-A | 20 | 21 | 22 | 22-A |
|---|---|---|---|---|---|---|---|
| Mooney Plasticity | 70 | 69 | 81 | 77 | 70 | 162 | Set up |
| Linhorst Plasticity | .016 | .018 | .024 | .035 | .022 | .064 | .081 |
| Williams: | | | | | | | |
| PN | 227 | 261 | 312 | 365 | 280 | 704 | 635 |
| RV | 2 | 4 | 28 | 50 | 5 | >565 | 439 |
| Gel percent | 9.0 | 10.7 | 14.0 | 21.1 | 14.2 | 75.6 | 66.8 |

These stocks were then compounded as follows on a cold mill.

| | | | | | | | |
|---|---|---|---|---|---|---|---|
| Pre-reacted Stock | 173.00 | 173.50 | 173.50 | 173.50 | 173.50 | 174.25 | 174.25 |
| Mineral Oil (same as in Examples 1-7) | 45.00 | 45.00 | 45.00 | 45.00 | 45.00 | 45.00 | 45.00 |
| Stearic Acid | 1.00 | 1.00 | 1.00 | 1.00 | 1.00 | 1.00 | 1.00 |
| MBT | 1.00 | 1.00 | 1.00 | 1.00 | 1.00 | 1.00 | 1.00 |
| "Tuex" | 1.50 | 1.00 | 1.00 | 1.00 | 1.00 | 1.50 | 1.50 |
| Sulfur | 2.00 | 2.00 | 2.00 | 2.00 | 2.00 | 0.75 | 0.75 |

The resulting stocks upon curing at 350° F. had the following properties:

| Cure Time: | | | | | | | |
|---|---|---|---|---|---|---|---|
| Tensile— | | | | | | | |
| 3½′ | 1,285 | 1,360 | 1,420 | 1,150 | 1,285 | 1,060 | 1,170 |
| 5′ | 1,385 | 1,345 | 1,450 | 1,310 | 1,290 | 1,120 | 1,165 |
| 10′ | 1,240 | 1,410 | 1,350 | 1,280 | 1,310 | 1,210 | 1,115 |
| Elongation— | | | | | | | |
| 3½′ | 870 | 840 | 830 | 770 | 850 | 800 | 730 |
| 5′ | 790 | 790 | 820 | 780 | 750 | 720 | 670 |
| 10′ | 660 | 730 | 690 | 690 | 680 | 660 | 580 |
| 300% Modulus— | | | | | | | |
| 3½′ | 220 | 215 | 215 | 230 | 230 | 220 | 260 |
| 5′ | 275 | 260 | 280 | 285 | 280 | 395 | 380 |
| 10′ | 395 | 375 | 390 | 400 | 425 | 430 | 465 |
| 500% Modulus— | | | | | | | |
| 3½′ | 485 | 490 | 520 | 525 | 475 | 520 | 670 |
| 5′ | 605 | 585 | 605 | 620 | 615 | 680 | 820 |
| 10′ | 800 | 765 | 800 | 800 | 820 | 850 | 950 |
| Hardness— | | | | | | | |
| 3½′ | 32 | 31 | 32 | 29 | 33 | 25 | 25 |
| 5′ | 35 | 33 | 35 | 33 | 37 | 28 | 28 |
| 10′ | 40 | 38 | 39 | 37 | 40 | 33 | 33 |
| Set— | | | | | | | |
| 3½′ | 15 | 13 | 13 | 14 | 14 | 16 | 16 |
| 5′ | 16 | 15 | 15 | 17 | 19 | 18 | 18 |
| 10′ | 23 | 21 | 20 | 22 | 22 | 25 | 23 |
| Torsional Hysteresis at 100° F.— | | | | | | | |
| 5′ | .152 | .137 | .140 | .128 | .157 | .082 | .075 |
| 10′ | .146 | .137 | -.135 | .115 | .137 | .089 | .062 |
| at 285° F.— | | | | | | | |
| 5′ | .117 | .114 | .110 | .117 | .121 | | .077 |
| 10′ | .114 | .108 | .104 | .102 | .110 | .078 | .066 |
| Electrical Resistivity— | | | | | | | |
| 3½′ | $3 \times 10^7$ | $2 \times 10^8$ | $1 \times 10^8$ | $7 \times 10^8$ | $1 \times 10^8$ | $>1 \times 10^{10}$ | $>1 \times 10^{10}$ |
| 5′ | $1 \times 10^7$ | $3.5 \times 10^7$ | $7 \times 10^7$ | $3.5 \times 10^8$ | $1 \times 10^8$ | $>1 \times 10^{10}$ | $>1 \times 10^{10}$ |
| 10′ | $6 \times 10^6$ | $1.5 \times 10^7$ | $7.5 \times 10^6$ | $2.5 \times 10^7$ | $1 \times 10^7$ | $>1 \times 10^{10}$ | $>1 \times 10^{10}$ |

Examples 18 to 22-A show that use of 0.5 part of three other ultra accelerators and 1.25 parts of sulfur is effective in bringing about the results of our invention.

*Example 23*

The following stock was first prepared:

| | |
|---|---|
| GR-I 18 | 100.00 |
| Super Beckacite 1003 resin * | 2.00 |
| FeCl₃·6H₂O | 2.00 |
| Zinc oxide | 3.00 |
| Stearic acid | 1.00 |
| FEF black | 50.00 |
| SRF black | 32.50 |
| Mineral oil (same as in Examples 1 to 7) | 50.00 |

* A heat-reactive, oil-soluble p-tertiary butyl phenol-formaldehyde resin of the resol type.

The foregoing ingredients were charged to a Banbury mixer and mixed therein at an elevated temperature, the mixture being discharged at 295–305° F. The total time charging, mixing and discharging consumed in the Banbury mixing operation was 10 minutes. The Linhorst plasticity of the resulting mixture was approximately .01 and the Mooney viscosity was approximately 34, indicating that very little reaction had occurred at the end of the mixing cycle. The hot stock was rolled into "pigs" and these pigs were maintained hot for 18 hours. Most of the reaction took place during the first 6 hours of this step. At the end of the 18 hour holding period the Linhorst plasticity and Mooney viscosity had increased considerably. A sample taken from the center of one pig had a Linhorst plasticity of .0395 and a Mooney viscosity of 55 while a sample taken from the outside portion of the same pig had a Linhorst plasticity of .0250 and a Mooney viscosity of 52.

The base compound obtained as above was then sulfured on a breakdown mill according to the following formulation:

| | |
|---|---|
| Base stock (prepared as above) | 240.50 |
| "Tuex" | 1.50 |
| MBT | 1.00 |
| Sulfur | 1.25 |

The resulting mixture was then extruded and the extruded material was cured 4¾ minutes at 360° F. The physical properties of the vulcanizate were as follows:

| | |
|---|---|
| Tensile | 1180 |
| Elongation | 640 |
| Modulus 300% | 395 |
| Modulus 500% | 830 |
| Set | 22 |
| Shore A hardness | 40 |

Example 23 is particularly noteworthy for the shortness of time in the Banbury. The use of the phenolic resin curative in conjunction with ferric chloride makes possible a time in the Banbury of only 10 minutes which is highly advantageous because of the high cost of Banbury time. The cost of the prolonged static heat treatment is far less than an equivalent heat treatment in the Banbury.

The use of heavy metal halides for accelerating the reaction between Butyl rubber and phenolic resin curatives is the subject of copending application of L. C. Peterson and H. J. Batts Serial No. 329,444, filed January 2, 1953. We can use any heavy metal halide as the accelerator. The heavy metals are listed in the periodic chart of the elements by Deming reproduced on pages 58 and 59 of "Handbook of Chemistry," edited by Lange, Sixth ed., 1946. We particularly prefer to use the chlorides of tin, iron and zinc, especially crystalline ferric chloride and crystalline stannous chloride.

Another advantage of the heavy metal halides is that traces of antioxidants, metal soaps, stearic acid and the like commonly present in the Butyl rubber, are rendered without effect on the reaction between the resin curative and the Butyl rubber. Therefore any Butyl rubber can be used and the process, especially when performed in the manner of Example 23 becomes entirely practical.

It will be noted that in Example 23 all of the black (82.50 parts) and all of the oil (50 parts) were charged initially, considerably simplifying the procedure.

Our copending application Serial No. 290,344, filed May 27, 1952, which is a continuation-in-part of abandoned application Serial No. 266,248, filed January 12, 1952, is directed to the partial reaction or "pre-scorching" of Butyl rubber with from 0.25 to 2.0 parts per 100 parts thereof of a 4-hydrocarbon-2,6-dimethylolphenol or a heat-reactive oil-soluble self-condensation product thereof.

This application is a continuation-in-part of abandoned application Serial No. 303,608, filed August 9, 1952, which shows reacting Butyl rubber with a curative to convert from 10 to 40% thereof to benzol-insoluble form and extending the reacted mixture with large amounts of oil. The present application is based on our discovery that as much as 80% of the Butyl rubber can be converted to benzol-insoluble form in the preliminary heat treatment of the mixture of Butyl rubber and curative or of Butyl rubber, carbon black and curative. It will be seen therefore that the subject matter common to the instant application and Serial No. 303,608 is pre-scorching in such a way as to convert 10 to 40% of the Butyl rubber to benzol-insoluble form and extending with large amounts of oil.

Having thus described our invention, what we claim and desire to protect by Letters Patent is:

1. As a new composition of matter, a firm, easily processable, unvulcanized, sulfur-vulcanizable, intimate mixture of a rubbery copolymer of from 90 to 99.5% of isobutylene and correspondingly from 10 to 0.5% of a conjugated $C_4$ to $C_6$ diolefin, which copolymer has been heated at a temperature of at least 235° F. with a curing agent in such amount and under such conditions that at least 10% but not over 80% of said copolymer has been rendered benzol-insoluble and the potential curing action of said curing agent on said copolymer has been substantially completely exhausted, and at least 25 parts of a substantially non-volatile hydrocarbon oil per 100 parts of said copolymer.

2. The method which comprises intimately admixing a rubbery copolymer of from 90 to 99.5% of isobutylene and correspondingly from 10 to 0.5% of a conjugated $C_4$ to $C_6$ diolefin with a curing agent and heating the resulting mixture at a temperature of at least 235° F., the amount of said curing agent and conditions of said heating step being such that at least 10% but not over 80% of said copolymer is rendered benzol-insoluble and the potential curing action of said curing agent on said copolymer is substantially completely exhausted, and incorporating with the reaction mixture at least 25 parts of a substantially non-volatile hydrocarbon oil per 100 parts of said copolymer.

3. As a new composition of matter, a firm, easily processable, unvulcanized, sulfur-vulcanizable, intimate mixture of a rubbery copolymer of from 90 to 99.5% of isobutylene and correspondingly from 10 to 0.5% of a conjugated $C_4$ to $C_6$ diolefin, which copolymer has been heated at a temperature of at least 235° F. with a curing agent in such amount and under such conditions that at least 10% but not over 80% of said copolymer has been rendered benzol-insoluble and the potential curing action of said curing agent on said copolymer has been substantially completely exhausted, and from 50 to 90 parts of a substantially non-volatile hydrocarbon oil per 100 parts of said copolymer.

4. The method which comprises intimately admixing a rubbery copolymer of from 90 to 99.5% of isobutylene and correspondingly from 10 to 0.5% of a conjugated $C_4$ to $C_6$ diolefin with a curing agent and heating the resulting mixture at a temperature of at least 235° F., the amount of said curing agent and the conditions of said heating step being such that at least 10% but not over 80% of said copolymer is rendered benzol-insoluble and the potential curing action of said curing agent on said copolymer is substantially completely exhausted, and incorporating with the reaction mixture from 50 to 90 parts of a substantially non-volatile hydrocarbon oil per 100 parts of said copolymer.

5. As a new composition of matter, a sulfur-vulcanized mixture of a rubbery copolymer of from 90 to 99.5% of isobutylene and correspondingly from 10 to 0.5% of a conjugated $C_4$ to $C_6$ diolefin, which copolymer has been reacted, prior to vulcanization, with a curing agent, by heating in admixture therewith at a temperature of at least 235° F., the amount of said curing agent and the conditions of said heating step being such that at least 10% but not over 80% of said copolymer has been rendered benzol-insoluble and the potential curing action of said curing agent on said copolymer has been substantially completely exhausted, and at least 25 parts of a substantially non-volatile hydrocarbon oil per 100 parts of said copolymer.

6. The method which comprises intimately admixing a rubbery copolymer of from 90 to 99.5% of isobutylene and correspondingly from 10 to 0.5% of a conjugated $C_4$ to $C_6$ diolefin with a curing agent and heating the resulting mixture at at least 235° F., the amount of said curing agent and the conditions of said heating step being such that at least 10% but not over 80% of said copolymer is rendered benzol-insoluble and the potential curing action of said curing agent on said copolymer is substantially completely exhausted, incorporating with the reaction mixture at least 25 parts of a substantially non-volatile hydrocarbon oil per 100 parts of said copolymer, subsequent to reaction incorporating vulcanizing material including sulfur in amount sufficient to complete the cure of said copolymer, and vulcanizing the resulting mixture.

7. As a new composition of matter, a sulfur-vulcanized mixture of a pre-reacted mixture of a rubbery copolymer of from 90 to 99.5% of isobutylene and correspondingly from 10 to 0.5% of a conjugated $C_4$ to $C_6$ diolefin and a curing agent therefor, the latter mixture having been heated, prior to vulcanization, at a temperature of at least 235° F., the amount of said curing agent and the conditions of the heating being such that at least 10% but not over 80% of said copolymer has been rendered benzol-insoluble and the potential curing action of said curing agent on said copolymer has been substantially completely exhausted and from 50 to 90 parts of a substantially non-volatile hydrocarbon oil per 100 parts of said copolymer.

8. The method which comprises intimately admixing a rubbery copolymer of from 90 to 99.5% of isobutylene and correspondingly from 10 to 0.5% of a conjugated $C_4$ to $C_6$ diolefin with a curing agent and heating the resulting mixture at a temperture of at least 235° F., the amount of said curing agent and the conditions of said heating step being such that at least 10% but not over 80% of said copolymer is rendered benzol-insoluble and the potential curing action of said curing agent on said copolymer is substantially completely exhausted, incorporating with the reaction mixture from 50 to 90 parts of a substantially non-volatile hydrocarbon oil per 100 parts of said copolymer, subsequent to reaction incorporating vulcanizing material including sulfur in amount sufficient to complete the cure of said copolymer, and vulcanizing the resulting mixture.

9. As a new composition of matter, a firm, easily processable, unvulcanized, sulfur-vulcanizable, intimate mixture of a rubbery copolymer of from 90 to 99.5% of isobutylene and correspondingly from 10 to 0.5% of a conjugated $C_4$ to $C_6$ diolefin, which copolymer has been heated at a temperature of at least 235° F. with tetramethyl thiuram disulfide in such amount and under such conditions that at least 10% but not over 80% of said copolymer has been rendered benzol-insoluble and the potential curing action of said disulfide on said copolymer has been substantially completely exhausted, and at least 25 parts of a substantially non-volatile hydrocarbon oil per 100 parts of said copolymer.

10. The method which comprises intimately admixing a rubbery copolymer of from 90 to 99.5% of isobutylene and correspondingly from 10 to 0.5% of a conjugated $C_4$ to $C_6$ diolefin with tetramethyl thiuram disulfide, and heating the resulting mixture at a temperature of at least 235° F., the amount of said tetramethyl thiuram disulfide and the conditions of said heating step being such that at least 10% but not over 80% of said copolymer is rendered benzol-insoluble and the potential curing action of said disulfide on said copolymer is substantially completely exhausted, and incorporating with the reaction mixture at least 25 parts of a substantially non-volatile hydrocarbon oil per 100 parts of said copolymer.

11. The method which comprises intimately admixing a rubbery copolymer of from 90 to 99.5% of isobutylene and correspondingly from 10 to 0.5% of a conjugated $C_4$ to $C_8$ diolefin with a mixture of sulfur and tetramethyl thiuram disulfide, and heating the resulting mixture at a temperature of at least 235° F., the amounts of said sulfur and tetramethyl thiuram disulfide and the conditions of said heating step being such that at least 10% but not over 80% of said copolymer is rendered benzol-insoluble and the potential curing action of said mixture on said copolymer is substantially completely exhausted, and incorporating with the reaction mixture at least 25 parts of a substantially non-volatile hydrocarbon oil per 100 parts of said copolymer.

12. The method which comprises intimately admixing a rubbery copolymer of from 90 to 99.5% of isobutylene and correspondingly from 10 to 0.5% of a conjugated $C_4$ to $C_8$ diolefin with para-dinitrosobenzene, and heating the resulting mixture at a temperature of at least 235° F., the amount of said para-dinitrosobenzene and the conditions of said heating step being such that at least 10% but not over 80% of said copolymer is rendered benzol-insoluble and the potential curing action of said para-dinitrosobenzene upon said copolymer is substantially completely exhausted, and incorporating with the reaction mixture at least 25 parts of a substantially non-volatile hydrocarbon oil per 100 parts of said copolymer.

13. The method which comprises intimately admixing a rubbery copolymer of from 90 to 99.5% of isobutylene and correspondingly from 10 to 0.5% of a conjugated $C_4$ to $C_8$ diolefin with a curing agent therefor composed of para-quinone-dioxime and red lead, and heating the resulting mixture at a temperature of at least 235° F., the amount of said curing agent and the conditions of said heating step being such that at least 10% but not over 80% of said copolymer is rendered benzol-insoluble and the potential curing action of said curing agent upon said copolymer is substantially completely exhausted, and incorporating with the reaction mixture at least 25 parts of a substantially non-volatile hydrocarbon oil per 100 parts of said copolymer.

14. As a new composition of matter, a sulfur-vulcanized mixture of a rubbery copolymer of from 90 to 99.5% of isobutylene and correspondingly from 10 to 0.5% of a conjugated $C_4$ to $C_8$ diolefin, which copolymer has been reacted, prior to vulcanization, with tetramethyl thiuram disulfide by heating in intimate admixture therewith at a temperature of at least 235° F., the amount of said disulfide and the conditions of said heating step being such that at least 10% but not over 80% of said copolymer has been rendered benzol-insoluble and the potential curing action of said disulfide on said copolymer has been substantially completely exhausted, and at least 25 parts of a substantially non-volatile hydrocarbon oil per 100 parts of said copolymer.

15. The method which comprises intimately admixing a rubbery copolymer of from 90 to 99.5% of isobutylene and correspondingly from 10 to .5% of a conjugated $C_4$ to $C_8$ diolefin with tetramethyl thiuram disulfide, and heating the resulting mixture at a temperature of at least 235° F., the amount of said disulfide and the conditions of said heating step being such that at least 10% but not over 80% of said copolymer is rendered benzol-insoluble and the potential curing action of said disulfide on said copolymer is substantially completely exhausted, incorporating with the reaction mixture at least 25 parts of a substantially non-volatile hydrocarbon oil per 100 parts of said copolymer, subsequent to reaction incorporating vulcanizing material including sulfur in amount sufficient to complete the cure of said copolymer, and vulcanizing the resulting mixture.

16. As a new composition of matter, a firm, easily processable, unvulcanized, sulfur-vulcanizable, intimate mixture of the material resulting from the mastication at a temperature of at least 300° F. of a mixture of a rubbery copolymer of from 90 to 99.5% of isobutylene and correspondingly from 10 to 0.5% of a conjugated $C_4$ to $C_8$ diolefin, carbon black and a curing agent for said copolymer, the amount of said curing agent and the conditions of said mastication being such that at least 10% but not over 80% of said copolymer has been rendered benzol-insoluble and the potential curing action of said curing agent on said copolymer has been substantially completely exhausted, and at least 25 parts of a substantially non-volatile hydrocarbon oil per 100 parts of said copolymer.

17. The method which comprises masticating at a temperature of at least 300° F. a mixture of a rubbery copolymer of from 90 to 99.5% of isobutylene and correspondingly from 10 to 0.5% of a conjugated $C_4$ to $C_8$ diolefin, carbon black and a curing agent for said copolymer, the amount of said curing agent and the conditions of said masticating step being such that at least 10% but not over 80% of said copolymer is rendered benzol-insoluble and the potential curing action of said curing agent on said copolymer is substantially completely exhausted, and incorporating with the reaction mixture at least 25 parts of a substantially non-volatile hydrocarbon oil per 100 parts of said copolymer.

18. As a new composition of matter, a vulcanizate of a mixture of the material resulting from the mastication at a temperature of at least 300° F. of a mixture of a rubbery copolymer of from 90 to 99.5% of isobutylene and correspondingly from 10 to 0.5% of a conjugated $C_4$ to $C_8$ diolefin, carbon black and a curing agent for said copolymer, the amount of said curing agent and the conditions of said mastication being such that at least 10% but not over 80% of said copolymer has been rendered benzol-insoluble and the potential curing action of said curing agent on said copolymer has been substantially completely exhausted, and at least 25 parts of a substantially non-volatile hydrocarbon oil per 100 parts of said copolymer.

19. A method which comprises masticating at a temperature of at least 300° F. a mixture of a rubbery copolymer of from 90 to 99.5% of isobutylene and correspondingly from 10 to 0.5% of a conjugated $C_4$ to $C_8$ diolefin, carbon black, and a curing agent for said copolymer, the amount of said curing agent and the conditions of said mastication being such that at least 10% but not over 80% of said copolymer is rendered benzol-insoluble and the potential curing action of said curing agent on said copolymer is substantially completely exhausted, incorporating with the reaction mixture at least 25 parts of a substantially non-volatile hydrocarbon oil per 100 parts of said copolymer, subsequent to said masticating step incorporating vulcanizing material including sulfur in amount sufficient to complete the cure of said copolymer, and vulcanizing the resulting mixture.

20. As a new composition of matter, a firm, easily processable, unvulcanized, sulfur-vulcanizable, intimate mixture of the material resulting from the mastication at a temperature of at least 300° F. of a mixture of a rubbery copolymer of from 90 to 99.5% of isobutylene and correspondingly from 10 to 0.5% of a conjugated $C_4$ to $C_8$ diolefin, carbon black, and tetramethyl thiuram disulfide, the amount of said disulfide and the conditions of said mastication being such that at least 10% but not over 80% of said copolymer has been rendered benzol-insoluble and the potential curing action of said disulfide on said copolymer has been substantially completely exhausted, and at least 25 parts of a substantially non-volatile hydrocarbon oil per 100 parts of said copolymer.

21. The method which comprises masticating at a temperature of at least 300° F. a mixture of a rubbery copolymer of from 90 to 99.5% of isobutylene and correspondingly from 10 to 0.5% of a conjugate $C_4$ to $C_8$ diolefin, carbon black and tetramethyl thiuram disulfide, the amount of said disulfide and the conditions of said mastication being such that at least 10% but not over 80% of said copolymer is rendered benzol-insoluble and the potential curing action of said disulfide on said copolymer is substantially completely exhausted and incorporating with the reaction mixture at least 25 parts of a substantially non-volatile hydrocarbon oil per 100 parts of said copolymer.

22. As a new composition of matter, a vulcanizate of a mixture of the material resulting from the mastication at a temperature of at least 300° F. of a mixture of a rubbery copolymer of from 90 to 99.5% of isobutylene and correspondingly from 10 to 0.5% of a conjugated $C_4$ to $C_8$ diolefin, carbon black and tetramethyl thiuram disulfide, the amount of said disulfide and the conditions of said masticating step being such that at least 10% but not over 80% of said coplymer has been rendered benzol-insoluble and the potential curing action of said disulfide on said copolymer has been substantially completely exhausted, and at least 25 parts of a substantially non-volatile hydrocarbon oil per 100 parts of said copolymer.

23. The method which comprises masticating at a temperature of at least 300° F. a mixture of a rubbery copolymer of from 90 to 99.5% of isobutylene and correspondingly from 10 to 0.5% of a conjugated $C_4$ to $C_6$ diolefin, carbon black, and tetramethyl thiuram disulfide, the amount of said disulfide and the conditions of said masticating step being such that at least 10% but not over 80% of said copolymer is rendered benzol-insoluble and the potential curing action of said disulfide on said copolymer is substantially completely exhausted, incorporating with the reaction mixture at least 25 parts of a substantially non-volatile hydrocarbon oil per 100 parts of said copolymer, subsequent to said masticating step incorporating vulcanizing material including sulfur in amount sufficient to complete the cure of said copolymer, and vulcanizing the resulting mixture.

24. A new composition comprising a pre-scorched mixture of a rubbery copolymer of isobutylene and from 0.5% to 10% of a conjugated $C_4$ to $C_6$ diolefin and a heat-reactive oil-soluble alkylphenol-formaldehyde resin in amount equal to from 0.25 to 2 parts per 100 parts of said copolymer, and at least 25 parts of a substantially non-volatile hydrocarbon oil per 100 parts of said copolymer.

25. A composition of matter as defined in claim 24 wherein the amount of said oil is equal to from 50 to 90 parts per 100 parts of said copolymer.

26. An inner tube made of a sulfur-vulcanized composition of matter as defined in claim 24 wherein the amount of said oil is equal to from 50 to 90 parts per 100 parts of said copolymer.

27. The method which comprises intimately admixing a rubbery copolymer of isobutylene and from 0.5 to 10% of a conjugated $C_4$ to $C_6$ diolefin with a heat-reactive oil-soluble alkylphenol-formaldehyde resin in amount equal to from 0.25 to 2 parts per 100 parts of said copolymer, pre-scorching the mixture by masticating it at a temperature of at least 300° F. until the curing action of said resin has been substantially completely exhausted, admixing the thus pre-scorched mixture with sulfur in amount sufficient to completely cure said copolymer and with a substantially non-volatile hydrocarbon oil in amount such as to give a total amount equal to from 50 to 90 parts per 100 parts of said copolymer, and vulcanizing the resulting mixture.

References Cited in the file of this patent

FOREIGN PATENTS 649,975    Great Britain  ----------- Feb. 7, 1951